3,647,908
OLEFIN DISPROPORTIONATION
Dirk Medema, Willy Brunmayer-Schilt, and Robert van Helden, Amsterdam, Netherlands, assignors to Shell Oil Company, New York, N.Y.
No Drawing. Filed Dec. 15, 1969, Ser. No. 885,264
Claims priority, application Great Britain, Jan. 27, 1969, 4,477/69
Int. Cl. C07c 3/62
U.S. Cl. 260—683 D                                    7 Claims

ABSTRACT OF THE DISCLOSURE

Olefins are disproportionated with a catalyst produced by contacting (a) a molybdenum or tungsten salt (b) an alkyl aluminum halide and (c) oxygen, an alkanoic acid or a mixture thereof.

BACKGROUND OF THE INVENTION

Reactions of olefinic molecules in the presence of metal-containing catalysts to produce other olefinic molecules are known in the art, such as "disproportionation." A typical olefin disproportionation process is illustrated by U.S. 3,261,879, issued July 19, 1966, to Banks, wherein two similar molecules of an olefin react in the presence of certain catalysts to produce one olefin of a higher carbon number and one olefin of a lower carbon number. For example, propylene disproportionates by the process of U.S. 3,261,879, to produce ethylene and butylenes.

A variation of this disproportionation process, which might be termed "reverse disproportionation" is illustrated by Netherlands patent application 6514985 of British Petroleum Company, Limited, published May 20, 1966, wherein, in one modification, molecules of two dissimilar olefins are reacted to form two molecules of a single olefin product, e.g., ethylene and 2-butene react to form propylene.

Another variation of the process, being conveniently termed "ring opening disproportionation" to distinguish it from other variations, is disclosed by U.S. 3,424,811, issued Jan. 28, 1969, to Mango, wherein a cyclic olefin and an acyclic olefin react to form a single product molecule. For example, ethylene reacts with cyclopentene by "ring opening disproportionation" to produce 1,6-heptadiene.

The term "disproportionation process" as herein employed is meant to include all variations of disproportionation reactions.

A variety of catalysts has been employed for conducting disproportionation reactions. One type of disproportionation catalyst is that described by Calderon et al., Tetrahedron Letters, 3327 (1967), which comprises a homogeneous catalyst composition produced by contacting tungsten hexachloride, ethanol and ethylaluminum dichloride.

SUMMARY OF THE INVENTION

It has been found that an improved process of disproportionating olefins is obtained through the use of a catalyst composition produced by contacting (1) a molybdenum or tungsten salt (2) an alkyl aluminum halide and (3) molecular oxygen, an alkanoic acid or a mixture thereof. The catalyst composition is characterized by improved activity and stability for all variations of olefin disproportionation.

DESCRIPTION OF PREFERRED EMBODIMENTS

The olefinic reactants

The process of the invention comprises the contacting of two olefinic reactants, which may be the same olefin or different olefins, in the presence of disproportionation catalysts of the invention. The olefinic reactant is acyclic, monocyclic or polycyclic of up to four rings, preferably of two rings, and is a monoolefin or is a polyolefinic reactant preferably of up to three non-conjugated carbon-carbon double bonds. When the olefinic reactant is cyclic, at least one ethylenic linkage is a portion of a carbocyclic ring of at least five carbon atoms.

A class of suitable acyclic olefinic reactants is represented by the Formula I $$RCH=CHR' \qquad (I)$$

wherein R and R' independently are hydrogen or alkyl of up to 20 carbon atoms with the total number of carbon atoms of the acyclic olefin, which total is herein termed $n$, being no more than 40.

Illustrative of acyclic olefinic reactants represented by Formula I are propylene, 1-butene, 2-butene, 2-pentene, 3-hexane, 4-methyl-1-heptene, 2-decene, 6-docene, 3-tetradecene, 10-eicosene and 4-tetracontene. In general, the preferred acyclic olefins are olefins of up to 30 carbon atoms, more preferably of up to 20 carbon atoms, and especially preferred are linear acyclic internal monoolefins, i.e., those olefins wherein both R and R' groups are n-alkyl.

A class of suitable cyclic olefinic reactants is represented by the Formula II

(II)

wherein A is a divalent hydrocarbon moiety of from three to ten carbons and of up to three ethylenic double bonds which are portions of carbocyclic rings and is selected so that the carbon atoms depicted in the Formula II are members of a carbocyclic ring of at least five carbon atoms. The total number of carbon atoms of the cyclic olefinic reactant of Formula II which total is herein termed $m$ is therefore from five to twelve.

Illustrative monocyclic olefinic reactants of Formula II include cyclopentene, cycloheptene, cyclooctene, cyclodecene, 1,5-cyclooctadiene, 1,6-cyclodecadiene and 1,5,9-cyclododecatriene, whereas illustrative polycyclic olefinic reactants are illustrated by bicyclo(2.2.1)hepta-2,5-diene, bicyclo(2.2.1)hept-2-ene, tricyclo(4.2.10$^{2,5}$)non-7-ene, tricyclo (5.2.1.0$^{2,6}$)deca-3,8-diene, bicyclo(2.2.2)oct-2-ene, bicyclo(2.2.2)octa-2,5-diene, bicyclo(3.3.0)oct-2-ene, dicyclopentadiene (3a,4,7,7a - tetrahydro - 4,7-methanoindene), and quadricyclo(2.2.1.2$^{2,6}$.0$^{3,5}$)non - 8 - ene. Particularly satisfactory results are obtained when the cyclic olefinic reactant is a monocyclic or a bicyclic olefinic reactant of up to two ethylenic linkages and most preferred are the monocyclic, monoolefinic reactants of from five to eight carbon atoms.

Another class of suitable olefinic reactants are polyolefinic compounds containing two or more non-conjugated double bonds. Illustrative polyolefins are 1,4-polybutadiene, 1,4-polyisoprene and a copolymer of styrene and butadiene.

When two different olefinic reactants are employed in the disproportionation process, the molar ratio of one olefinic reactant to the other olefinic reactant is not critical, and up to a 20-fold excess, preferably up to a 10-fold excess of one olefinic reactant can be employed.

The catalyst

The precise chemical form of the catalyst is not known with certainty and the catalyst is best defined in terms of its method of production. The catalyst results from the intimate contact of (1) molybdenum or tungsten salt (2) an alkyl aluminum halide and (3) molecular oxygen, a lower alkanoic acid or a mixture thereof.

Although a variety of molybdenum and tungsten salts such as the acetylacetonate, sulfate, nitrate, oxyhalides or the like is operable as the catalyst precursor, superior results are obtained when the molybdenum or tungsten salt is a molybdenum pentahalide or tungsten hexahalide. Exemplary molybdenum pentahalides include molybdenum pentafluoride, molybdenum pentachloride, molybdenum pentabromide and molybdenum pentaiodide; and exemplary tungsten hexahalides include tungsten hexafluoride, tungsten hexachloride, tungsten hexabromide, and tungsten hexaiodide. The bromide and chloride salts of molybdenum and tungsten, e.g., $MoCl_5$, $MoBr_5$, and $WBr_6$, are preferably employed as precursors for preparing the catalyst compositions; especially preferred is tungsten hexachloride and tungsten hexabromide.

Suitable alkyl aluminum halide catalyst precursors include alkyl aluminum sesquihalides represented by Formula III and alkyl aluminum dihalides and dialkyl aluminum halides represented by the Formula IV

$$R''_3Al_2X_3 \quad R''_nAlX_{(3-n)}$$
$$(III) \quad\quad (IV)$$

wherein R'' is alkyl of up to 8 carbon atoms, preferably of up to 4, X is halogen, preferably halogen of atomic number from 17 to 35 inclusive, i.e., the middle halogens chlorine and bromine, and $n$ is a whole number from 1 to 2 inclusive. Illustrative of alkyl aluminum sesquihalides of Formula III are triethylaluminum sesquichloride and trimethylaluminum sesquibromide. Illustrative alkyl aluminum dihalides of Formula IV are ethylaluminum dichloride, ethylaluminum dibromide, propylaluminum dichloride, and butylaluminum diiodide. Illustrative dialkyl aluminum halides of Formula IV are diethylaluminum chloride, dipropylaluminum bromide, and dioctylaluminium fluoride. In most applications, the particularly preferred class of alkyl aluminum halides are dialkyl aluminum halides and trialkyl aluminum sesquihalides, especially diethylaluminum chloride and triethylaluminum sesquichloride.

The ratio of molybdenum or tungsten salt to alkyl aluminum halide used to form the disproportionation catalyst will in part depend upon the type of alkyl aluminum compound employed. It will be understood that dialkyl aluminum halides can be considered as having 2 moles of alkylaluminum bond for each mole of aluminum, whereas alkyl aluminum dihalides supply one mole of alkyl-aluminum bond per mole of aluminum and alkyl aluminum sesquihalides supply one and one-half moles of alkyl-aluminum bond per mole of aluminum. The quantity of the alkyl aluminum compound is selected so that the ratio of moles of alkyl aluminum bond provided by the alkyl aluminum compound to moles of molybdenum or tungsten salt is from about 1:1 to 20:1, preferably from about 2:1 to 10:1.

In order to obtain the improved catalyst composition of the invention, it is essential to provide as a catalyst promoter specified amounts of molecular oxygen, a lower alkanoic acid of from 1 to 4 carbon atoms, e.g., formic acid, acetic acid, propionic acid and butyric acid, or a mixture of molecular oxygen and a lower alkanoic acid. Largely because of the ease of separating molecular oxygen from the reaction mixture, molecular oxygen is preferred as a promoter over lower alkanoic acids or a mixture of oxygen and an alkanoic acid.

The amount of catalyst promoter used to form the improved disproportionation catalyst depends upon the amount of the tungsten or molybdenum salt and the amount of alkyl aluminum halide employed. In general, molar ratios of oxygen, alkanoic acid or a mixture of oxygen and alkanoic acid to molybdenum or tungsten salt, calculated as the metal, of from about 0.25:1 to about 15:1 are satisfactory with amounts of from about 0.5 to 1 to about 5:1, calculated on the same basis, being preferred. When the catalyst promoter is an alkanoic acid alone, the most preferred molar ratio of alkanoic acid to molybdenum or tungsten salt, calculated on the same basis, is from about 0.5:1 to about 1:1.

The amount of disproportionation catalyst is not critical. Generally, molar ratios of catalyst composition, calculated as moles of tungsten or molybdenum metal, to olefinic reactant, of from about $1:10^2$ to $1:10^6$ are satisfactory with amounts from about $1:10^3$ to $1:10^5$, calculated on the same basis, being preferred.

The catalyst composition is prepared by contacting the molybdenum or tungsten salt, the alkyl aluminum halide and the catalyst promoter at any convenient temperature and pressure. Although the sequence in which the catalyst components are contacted is not critical, a more active catalyst composition is obtained by premixing the tungsten or molybdenum salt and the catalyst promoter in the absence of the alkyl aluminum halide component, and subsequently contacting the resulting mixture with the alkyl aluminum halide. In order to insure intimate contacting of the catalyst components, it is generally preferred to use an inert reaction diluent which is liquid at contact temperature and pressure. Illustrative of suitable diluents are monoaromatic hydrocarbons of from 6 to 12 carbon atoms, e.g., benzene and toluene. In a preferred modification of the process, the catalyst composition is formed in situ by contacting the catalyst precursor components and diluent in the presence of the olefinic reactant(s).

Reaction conditions

The disproportionation process is conducted by contacting, in liquid phase, the olefinic reactant(s), the catalyst composition and a reaction diluent which is the same or is similar to the diluent utilized in the production of the catalyst composition. In most instances, added diluent is used in amounts of up to about 5 moles of diluent per mole of olefinic reactants. The disproportionation process is preferably conducted in an inert atmosphere, e.g., nitrogen, helium, or saturated hydrocarbon gases such as methane and ethane.

The temperature employed in the process of the invention is not very critical, and varies between wide limits. Although temperatures between −100° C. and +100° C. and even higher can be used, it is one of the special features of the process of the invention that it can be carried out at or near room temperature, and accordingly temperatures betwene 0° C. and 100° C., in particular between 0° C. and 60° C., are preferred.

The pressure during the process according to the present invention is not very critical. Pressures of up to 100 atmospheres can be used, but the reaction is most conveniently carried out at a pressure of about one atmosphere or at the pressure of the saturated vapor of the olefins present at the reaction temperature concerned, if the latter pressure is higher than one atmosphere.

After the reaction has been completed, or has been carried out to a desired degree of conversion, it is advantageous to inactivate the catalyst system before components are isolated from the reaction mixture. The inactivation of the catalyst can be accomplished by addition of a relatively large amount of a compound with an active hydrogen atom, such as water, methanol, ethanol, isopropanol and acetic acid.

The products obtained after disproportionation according to the invention can be isolated from the reaction mixture in any convenient manner. By way of example the following methods may be mentioned: If the products do not decompose at or below their boiling point at a certain pressure, they can be isolated from the reaction mixture by fractional distillation, under that pressure or at a lower pressure if desired. It is also possible to separate the components of the reaction mixture by cooling that mixture and removing condensed or crystallized products, or by means of gas chromatographic techniques.

In cases where high-molecular-weight products (such as polymers) are present in the reaction mixture, these can be recovered therefrom by, for example, distilling off the volatile products, under reduced pressure if desired. It is also possible to recover high-molecular-weight compounds by precipitation through addition of non-solvents, e.g., alcohols, lower carboxylic acids and the like.

The products

According to the process of the invention two olefinic reactants are disproportionated to a product comprising olefin(s) having a total number of carbon atoms equal to the sum of the carbon atoms of the two olefinic reactants and having a number of ethylenic linkages equal to the sum of the ethylenic double bonds of the reactants.

One variation of the process comprises the disproportionation of two molecules of the same olefinic reactant. The reaction of two molecules of an acyclic olefin of Formula I generally produces one olefin of a lower carbon number as depicted in Equation 1

$$2RCH{=}CHR' \rightarrow RCH{=}CHR + R'CH{=}CHR \quad (1)$$

wherein R and R' have the previously stated significance. If R and R' represent identical groups, it is appreciated that the disproportionation reaction will not cause any skeletal changes as the products RCH=CHR and R'CH=CHR' will be equivalent to R'CH=CHR'. By way of specific illustration, the reaction of two molecules of propylene produces ethylene and 2-butene. However, the reaction of two molecules of 2-butene produces two molecules of 2-butene. The reaction of two molecules of cyclic olefinic reactant of Formula II, however, produces a single cyclic olefin produced as depicted in Equation 2

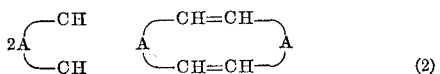

(2)

By way of specific illustration, the reaction of two molecules of cyclooctene produces 1,9-cyclohexadecadiene.

Another variation of the process comprises the disproportionation of two different acyclic olefinic reactants. By way of specific illustration, the reaction of 2-butene and 3-hexene produces two molecules of 2-pentene and the reaction of 2-butene with 1,4-polybutadiene produces two molecules of 1,4-polybutadiene having a molecular weight which is less than the molecular weight of the starting 1,4-polybutadiene.

Still another variation of the process is "ring-opening" disproportionation wherein an acyclic olefinic reactant represented by Formula I is contacted with a cyclic olefinic reactant represented by Formula II. The product of "ring-opening" is a single olefinic compound with one less carbocyclic ring than the cyclic olefinic reactant of Formula II. In terms of the Formulas I and II, the product is represented by Formula V

(V)

wherein R, R' and A have the previously stated significance. By way of specific illustration, from reaction of 2-butene and cyclopentene is produced 2,7-nonadiene. Other typical products include 2,8-decadiene produced by reaction of cyclohexene and 2-butene, 3,8-undecadiene produced from 3-hexene and cyclopentene, 1,5,9-decatriene produced by reaction of ethylene and 1,5-cyclooctadiene, and 1,4-divinylcyclohexane from ethylene and bicyclo-(2.2.2)oct-2-ene.

In "ring-opening" disproportionation, the cyclic olefinic reactant is preferably a monocyclic or a bicyclic olefinic reactant of up to two ethylenic linkages and most preferably is a monocyclic, monoolefinic reactant of from five to eight carbon atoms, and the acyclic olefinic reactant is preferably an internal olefin which is symmetrical about the double bond, i.e., those olefins wherein both R and R' groups are alkyl and R=R'. The molar ratio of cyclic olefinic reactant to the acyclic olefin in ring-opening disproportionation is not critical, although it is frequently useful to employ a molar excess of the acyclic olefin. Molar ratios of acyclic olefin to cyclic oleinic reactant from about 1:1 to about 20:1 are satisfactory with molar ratios from about 1:1 to about 10:1 being preferred.

It is appreciated that an olefinic product produced by any variation of the disproportionation process can undergo further disproportionation with another olefin present in the reaction mixture. For example, 1,6-heptadiene produced from reaction of cyclopentene and ethylene can react with another molecule of cyclopentene to produce 1,6,11-dodecatriene, and 1,9-cyclohexadecadiene produced from the reaction of two molecules of cyclooctene can react with additional molecules of cyclooctene to give a high molecular weight monocyclic polyene.

The olefinic products, for the most part, have established utility as precursors of polymers, e.g., as the third component of ethylene-propylene terpolymers useful as synthetic elastomers. Cleavage of the ethylenic bonds of polyolefinic products as by ozonization produces di- or polycarboxylic acids which are reacted with diamines, e.g., hexamethylene-diamine, to form nylons which are useful in synthetic fibers. The olefinic products are converted to secondary and tertiary alcohols as by sulfuric acid-catalyzed hydration. Alternatively, the olefinic products are converted by conventional "Oxo" processes to aldehydes which are hydrogenated with conventional catalysts to the corresponding alcohols. The $C_{12}$-$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

EXAMPLE I

All experiments weer carried out under nitrogen at 20° C. at atmospheric pressure with stirring.

In each experiment a 50-ml. round-bottomed flask was charged with 15 ml. toluene, 100 mmole 2-pentene (36% cis), 0.01 mmole $WCl_6$ and an amount of acetic acid. In order to start the disproportionation reaction, 0.04 mmole of ethylaluminum dichloride in 0.35 ml. toluene was subsequently introduced; the disproportionation reaction was stopped after five minutes by addition of one ml. ethanol. The conversion of the 2-pentene (which had disproportionated to 2-butene and 3-hexene) was measured with the aid of gas chromatography. The disproportionation reactions are reversible, the conversion of 2-pentene at equilibrium being about 50 mole percent.

Table I shows the conversions of 2-pentene measured as a function of the acetic acid/$WCl_6$ molar ratio.

TABLE I

| Experiment No. | Molar ratio acetic acid/$WCl_6$ | Conversion of 2-pentene after 5 minutes (mole percent) |
|---|---|---|
| 1 | 0 | 22 |
| 2 | 0.25 | 38 |
| 3 | 0.5 | 48 |
| 4 | 1.0 | 44 |
| 5 | 1.5 | 35 |
| 6 | 2.0 | 25 |

EXAMPLE II

The experiments were carried out in a nitrogen atmosphere at 20° C. and atmospheric pressure in a 50-ml. round-bottomed flask with stirring. The oxygen, which is part of the catalyst, was injected into the nitrogen atmosphere by means of a syringe.

In each experiment the round-bottomed flask was provided with 15 ml. toluene, 100 mmole 2-pentene (52% cis), 0.01 mmole $WCl_6$ and the desired amount of molecular oxygen. Subsequently 0.04 mmole ethylaluminum dichloride was added and 4 minutes after addition of the ethylaluminum dichloride a small sample was taken, in which the disproportionation reaction was stopped by means of ethanol, and conversion of 2-pentene in the sample was determined by means of gas chromatography.

Immediately after the 4-minutes sample had been taken, 50 mmole 2-pentene and 7.5 ml. toluene were added to the contents of the round-bottomed flask and the conversion of the total amount of 2-pentene added was determined by taking samples after 5½, 10 and 15 minutes (time zero=time of addition of ethylaluminum dichloride) and analyzing these samples after stopping the disproportionation reaction therein by addition of ethanol. Table II shows the results.

TABLE II

| Exp. No. | Molar ratio $O_2/WCl_6$ | Conversion of total amount of 2-pentene added (in mole percent) after— | | | | | |
|---|---|---|---|---|---|---|---|
| | | 1 min. | 4 min. | Immediately after second addition of 2-penetene (calculated) | 5½ min. | 10 min. | 15 min. |
| 7 | 0 | 25.0 | 38.2 | 25.6 | 28.8 | 32.0 | 33.5 |
| 8 | 0.5 | 38.0 | 48.5 | 32.4 | 39.0 | 44.0 | 48.1 |
| 9 | 1.0 | 36.0 | 46.0 | 30.6 | 35.0 | 41.2 | 43.3 |
| 10 | 2.0 | 38.7 | 49.5 | 33.0 | 36.3 | 40.5 | 42.9 |
| 11 | 4.0 | 39.5 | 44.5 | 31.1 | 35.0 | 39.0 | 39.8 |
| 12 | 23.0 | 36.0 | 47.7 | 31.9 | 32.6 | | 33.5 |

It can be seen from this table that although the initial activity of the catalyst is high even with a $O_2/WCl_6$ ratio of 23, this activity rapidly declines. From experiments 8, 9 and 10 it can be seen that the catalyst is more stable with time with lower $O_2/WCl_6$ ratios and the high initial activity for disproportionation is retained to an appreciable extent.

EXAMPLE III

A 50-ml round-bottomed flask is charged with 15 ml. of toluene, 100 mmole of 2-pentene, 0.01 mmole of $WCl_6$, 0.005 mmole of acetic acid, and 0.005 mmole of oxygen. A 0.04 mmole sample of ethylaluminum dichloride in 0.35 ml. toluene is then introduced. Gas chromatographic analysis of the reaction mixture shows that the disproportionation of the 2-pentene is accelerated by the presence of the acetic acid and oxygen in a manner similar to that observed in Example I and II.

EXAMPLE IV

A 50-ml. round-bottomed flask is charged with 15 ml. of toluene, 100 mmole of 2-butene, 100 mmole of cyclooctene, 0.1 mmole of $MoBr_5$ and 0.005 mmole of acetic acid. A 0.04 mmole sample of diethylaluminum bromide in 0.35 ml. toluene is then introduced. Gas chromatographic analysis of the reaction mixture shows a good yield of 2,10-dodecadiene arising from the ring opening disproportionation of cyclooctene with a 2-butene.

EXAMPLE V 50-ml. round-bottomed flask is charged with 100 mmole 2-butene, 1 g. of polybutadiene polymer (cis-1,4-content of 96% molecular weight of about 100,000), 25 ml. of toluene, 0.005 mmole of oxygen and 0.1 mmole of $WBr_6$. A 0.05 mmole sample of triethylaluminum sesquichloride in heptane solution is then added and the reaction mixture maintained at room temperature. The resulting product mixture comprises a polybutadiene of lower-molecular weight than the starting polymer.

We claim as our invention:

1. A process of disproportionating two acyclic hydrocarbon monoolefinic reactants of up to 40 carbon atoms to two monoolefinic products having a total number of carbon atoms equal to the sum of the carbon atoms of the two monoolefinic reactants by contacting the two monoolefinic reactants at a temperature of from about 0° C. to 100° C. in the presence of a catalyst produced by intimately contacting (a) a molybdenum pentahalide or tungsten hexahalide (b) an alkyl aluminum halide, and (c) a promoter selected from molecular oxygen, or a mixture of oxygen and an alkanoic acid of from 1 to 4 carbon atoms, the molar ratio of alkyl-aluminum bond to molybdenum pentahalide or tungsten hexahalide being from about 1:1 to 20:1 and the molar ratio of promoter to molybdenum pentahalide or tungsten hexahalide being from about 0.25:1 to 15:1.

2. The process of claim 1 wherein the molar ratio of promoter to molybdenum pentahalide or tungsten hexahalide is from 0.5:1 to 5:1.

3. The process of claim 2 wherein the alkyl aluminum halide is represented by the formula:

$$R''_3Al_2X_3 \qquad R''_nAlX_{(3-n)}$$

wherein R'' is alkyl of up to 8 carbon atoms, X is chlorine or bromine and $n$ is 1 or 2.

4. The process of claim 3 wherein two linear internal acyclic monoolefins are contacted.

5. The process of claim 4 wherein the promoter is molecular oxygen.

6. The process of claim 5 wherein the alkyl aluminum halide is triethylaluminum sesquichloride and the tungsten hexahalide is tungsten hexachloride.

7. The process of claim 4 wherein the alkanoic acid is acetic acid.

References Cited

UNITED STATES PATENTS

| 3,544,649 | 12/1970 | Dixon et al. | 260—683 |
| 3,492,245 | 1/1970 | Calderon et al. | 252—429 |
| 3,449,310 | 6/1969 | Dall'asta et al. | 252—429 X |
| 3,007,908 | 11/1961 | Graf et al. | 252—429 X |
| 3,129,256 | 4/1964 | Hay et al. | 252—429 X |

JAUL M. COUGHLAN, Jr., Primary Examiner

U.S. Cl. X.R.

252—429 B; 260—94.7 D, 680 R